United States Patent Office 3,356,690
Patented Dec. 5, 1967

3,356,690
SYNTHESIS OF 2,3-DIHYDRO-2,2-DIMETHYL-7-BENZOFURANYL N-METHYLCARBAMATE
Edward F. Orwoll, Baltimore, Md., assignor to FMC Corporation, New York, N.Y., a corporation of Delaware
No Drawing. Filed Feb. 4, 1965, Ser. No. 430,455
7 Claims. (Cl. 260—346.2)

This invention relates to a novel process for the synthesis of 2,3-dihydro-2,2-dimethyl-7-benzofuranyl N-methylcarbamate from ortho-bromophenol, employing a novel reaction sequence, as follows: Ortho-bromophenol is converted to o-bromophenyl methallyl ether by reaction with a methallyl halide in the presence of a base. Ortho-bromophenyl methallyl ether is then heated to cause rearrangement to 2-bromo-6-methallylphenol or to 2-bromo-6-isobutenylphenol, which then cyclizes to the 2,3-dihydro-2,2-dimethyl-7-bromobenzofuran. Replacement of the bromine by hydroxyl is then accomplished by heating the 7-bromobenzofuran with a solution of a strongly alkaline material such as an alkali or alkaline earth metal hydroxide or alkoxide at elevated temperatures. Conversion of 2,3-dihydro-2,2-dimethyl-7-benzofuranol to 2,3-dihydro-2,2-dimethyl-7-benzofuranyl N-methylcarbamate is accomplished by reaction with methyl isocyanate or methylcarbamyl chloride. Alternatively, the benzofuranol may be converted to the chloroformate by reaction with phosgene, and the chloroformate then converted to the N-methylcarbamate by reaction with monomethylamine. Ortho-bromophenol may be prepared by bromination of disodium phenol-2,4-disulfonate followed by removal of the sulfonate groups by heating at 200° C. with dilute sulfuric acid (Huston and Ballard, Organic Syntheses, Coll. vol. II, p. 97).

Ortho-bromophenyl methallyl ether is prepared by heating the o-bromophenol with a methallyl halide in the presence of a base such as an alkali metal hydroxide or carbonate. Although methallyl bromide or iodide are more reactive, methallyl chloride is preferred for reasons of economy. The reaction proceeds by way of the phenol salt, and, if desired, this may be preformed by prior reaction of o-bromophenol with the alkali metal hydroxide or carbonate. Organic solvents such as methanol, dioxane and dimethylformamide may be used in the preparation of the ether, as well as low molecular weight ketones such as acetone or methyl ethyl ketone. The reaction may also be carried out in aqueous medium. The reaction may be conducted at the atmospheric boiling point of the mixture, usually 60–100° C., or at superatmospheric pressures, and temperatures up to about 150° C. or higher.

Rearrangement of o-bromophenyl methallyl ether is accomplished by heating at temperatures of 150–300° C.; temperatures of 190–230° C. are preferred. The usual product of rearrangement is 2-bromo-6-methallylphenol. However, some of the isomeric 2-bromo-6-isobutenylphenol may also be formed. Either or both of these isomers may be used in the next step of the process. While high-boiling solvents, such as o-dichlorobenzene, may be used, it is preferred to operate without solvent. The reaction is rapid and exothermic, and may be carried out continuously, semi-continuously, or batchwise, at atmospheric pressure or, alternatively, at partially reduced pressure so that the reactants and reaction products reflux at a somewhat lower reaction temperature.

Cyclization of 2-bromo-6-methallylphenol or its isobutenyl isomer may be accomplished by heating, and thermal cyclization occurs at temperatures above about 200° C., preferably 220°–300° C.

The cyclized product may be removed by fractional distillation at atmospheric or reduced pressure. The cyclization may also be carried out under milder temperature conditions by employing a suitable catalyst. Effective catalysts include acidic materials, such as pyridine hydrochloride, phosphoric acid or formic acid, and such catalysts effect cyclization at a temperature above about 100° C., preferably 150–250° C. An effective catalyst is magnesium chloride, and excellent results are obtained at levels of 0.1–10 percent, preferably about one percent, by weight of the methallylphenol. Purification of 2,3-dihydro-2,2-dimethyl-7-bromobenzofuran may be accomplished by fractional distillation, after removal of catalyst by standard procedures. Ordinarily, however, the crude material is sufficiently pure to be used directly in the next step.

Conversion of 2,3-dihydro-2,2-dimethyl-7-bromobenzofuran to 2,3-dihydro-2,2-dimethyl-7-benzofuranol is accomplished by heating at elevated temperatures with an alkali or alkaline earth metal hydroxide. The use of sodium or potassium hydroxide, or mixtures thereof, is preferred for reasons of economy. Mixtures of alkali metal hydroxides and alkaline earth oxides, hydroxides or carbonates may also be used. Replacement of bromine with hydroxyl is accomplished at temperatures above about 150° C. The reaction may be carried out in the presence or absence of a solvent, although it is preferred to use a mutual solvent such as a lower alcohol or a glycol. In addition, solutions of the alkali metal hydroxides in water, aqueous alcohol or aqueous glycol may be employed. Catalysts may be used to accelerate the reaction and improve the conversion. Useful catalysts include copper metal, cuprous oxide, cuprous chloride, cuprous bromide and cupric sulfate. An especially useful catalyst is cupric nitrate.

Recovery of 2,3-dihydro-2,2-dimethyl-7-benzofuranol from the reaction mixture may be accomplished in several ways. For example, the mixture may first be treated with an acid to liberate the benzofuranol from its salt. If a reaction solvent is present, this may be separated by distillation. Recovery of the benzofuranol may then be accomplished by adding water to dissolve the salts and removing the benzofuranol by steam distillation, decantation or solvent extraction.

An alternative method of recovery of the benzofuranol, which is particularly useful if complete conversion of 7-bromobenzofuran is not achieved, involves removal of solvent and unconverted 7-bromobenzofuran before treatment of the mixture with acid. After the neutral organic materials have been removed, the mixture is treated with aqueous acid to liberate the benzofuranol from its salt. The benzofuranol can then be removed from the aqueous salt solution by steam distillation, decantation or solvent extraction.

Several methods are available for conversion of 2,3-dihydro-2,2-dimethyl-7-benzofuranol to the corresponding N-methylcarbamate. Among these are reaction with methyl isocyanate or methyl carbamyl chloride and reaction with phosgene in the presence of a base such as dimethylaniline to form the chloroformate, followed by treatment of the latter with monomethylamine to produce the N-methylcarbamate.

The novel synthesis described above is illustrated in the following specific examples, which represent useful and preferred procedures for carrying out the subject reactions, but are not limitative of reagents or conditions.

EXAMPLE I

*Preparation of 2,3-dihydro-2,2-dimethyl-7-benzofuranol*

A solution of 121 g. of o-bromophenol in 200 ml. of methanol was placed in a one liter flask equipped with agitator, thermometer, adding funnel and reflux condenser. To the solution was added 162 g. of 25 percent sodium methylate in methanol. The solution was heated to reflux and 81.5 g. of methylallyl chloride was added in one hour, and the refluxing was thereafter continued for five hours. After cooling to room temperature, precipitated salt was filtered and washed with methanol. The combined filtrate and wash was evaporated to a residue weighing 163 g. which was dissolved in toluene and washed with 2 percent aqueous sodium hydroxide and water. The toluene was stripped in vacuo, leaving a residual crude o-bromophenyl methallyl ether. Ten grams of the residue under an atmosphere of nitrogen was heated in an oil bath at 238–241° C. for one hour. The remainder of the crude o-bromophenyl methallyl ether was added to the isomerized portion over a period of one and one-half hours at a temperature of 220–240° C. The crude product so obtained was distilled in vacuo. The fraction boiling at 115–125° C. at 7 torr was found to be substantially pure 2,3-dihydro-2,2-dimethyl-7-bromobenzofuran.

Fifty g. of 2,3-dihydro-2,2-dimethyl-7-bromobenzofuran was mixed with 433 g. of ethylene glycol, 26 g. of sodium hydroxide and 2 g. of $Cu(NO_3)_2 \cdot 3H_2O$. The mixture was agitated and heated at 200–210° C. for four hours in a magnetically agitated autoclave. The cooled reaction mixture was diluted with 500 ml. of water, and extracted with ether to remove neutral by-products and the unreacted aryl bromide.

EXAMPLE II

*Preparation of 2,3-dihydro-2,2-dimethyl-7-benzofuranol*

Fifty grams of 2,3-dihydro-2,2-dimethyl-7-bromobenzofuran, 520 g. of 5 percent aqueous sodium hydroxide and 1.5 g. of cuprous oxide was charged into a magnetically agitated autoclave and heated at 180–200° C. for four hours. The reaction mixture was cooled, filtered and extracted with ether to remove neutral organic materials. The aqueous phase was acidified and further processed in the manner of Example I. Evaporation of the final ether extract produced, as a residual oil, 16 g. of substantially pure 2,3-dihydro-2,2-dimethyl-7-benzofuranol.

EXAMPLE III

*Preparation of 2,3-dihydro-2,2-dimethyl-7-benzofuranol*

Fifty grams of 2,3-dihydro-2,2-dimethyl-7-bromobenzofuran was mixed with 630 g. of a 7% solution of sodium hydroxide in ethylene glycol in a glass flask. Two and one-half grams of cupric nitrate trihydrate was added and the apparatus was purged with nitrogen. The mixture was stirred and heated at 180° C. for five hours, then was heated at 195° C. for three hours. The solution was cooled, diluted with one liter of water and washed with ether. The aqueous phase was acidified with sulfuric acid and extracted with two 250 ml. portions of ether. Evaporation of the solvent from the combined extracts produced pure 2,3-dihydro-2,2-dimethyl-7-benzofuranol in good yield.

EXAMPLE IV

*Preparation of 2,3-dihydro-2,2-dimethyl-7-benzofuranyl N-methylcarbamate*

Into a twelve liter flask were charged 2.3 kg. of 2,3-dihydro-2,2-dimethyl-7-benzofuranol, 3.5 liters of diethyl ether and 6 g. of triethylamine. The solution was cooled to 17° C. and 839 g. of methyl isocyanate was added in thirty-five minutes with external cooling to maintain the temperature below 27° C. After standing overnight, the slurry was filtered, washed with ether and dried to produce white crystalline 2,3-dihydro-2,2-dimethyl-7-benzofuranyl N-methylcarbamate melting at 150–153° C.

The product of the above-described synthetic procedures, 2,3-dihydro-2,2-dimethyl-7-benzofuranyl N-methylcarbamate, is an effective pesticide, particularly useful for the control of Arthropoda and Nematoda, as described in U.S. patent application Ser. No. 339,612, filed Jan. 23, 1964.

It is apparent that many modifications may be made in the synthetic procedures described and illustrated herein, without departing from the spirit and scope of the following claims.

What is claimed is:

1. Process for the synthesis of 2,3-dihydro-2,2-dimethyl-7-benzofuranyl N-methylcarbamate which comprises the steps of (a) reacting o-bromophenol with methylallyl steps of (a) reacting o-bromophenol with methallyl halide to form o-bromophenyl methallyl ether, (b) rearranging o-bromophenyl methallyl ether to produce an isomer selected from the group consisting of 2-bromo-6-methallylphenol and 2-bromo-6-isobutenylphenol, (c) cyclizing said isomer to 2,3-dihydro-2,2-dimethyl-7-bromobenzofuran, (d) hydrolyzing at elevator temperatures of at least 150° C. the 2,3-dihydro-2,2-dimethyl-7-bromobenzofuran to form 2,3-dihydro-2,2-dimethyl-7-benzofuranol, and (e) converting 2,3-dihydro-2,2-dimethyl-7-benzofuranol to 2,3-dihydro-2,2-dimethyl-7-benzofuranyl N - methylcarbamate.

2. Process for the synthesis of 2,3-dihydro-2,2-dimethyl-7-benzofuranyl N-methylcarbamate which comprises the steps of (a) reacting o-bromophenol with methallyl halide in the presence of an acid acceptor to form o-bromophenyl methallyl ether, (b) rearranging at elevated temperatures o-bromophenyl methallyl ether to produce an isomer selected from the group consisting of 2-bromo-6-methallylphenol and 2-bromo-6-isobutenylphenol, (c) cyclizing at elevated temperatures said isomer to 2,3-dihydro-2,2-dimethyl-7-bromobenzofuran, (d) hydrolyzing at elevated temperatures of at least 150° C. in alkaline medium 2,3-dihydro-2,2-dimethyl-7-bromobenzofuran to form 2,3-dihydro-2,2-dimethyl-7-benzofuranol, and (e) converting 2,3-dihydro-2,2-dimethyl-7-benzofuranol to 2,3-dihydro-2,2-dimethyl-7-benzofuranyl N-methylcarbamate.

3. Process for the synthesis of 2,3-dihydro-2,2-dimethyl-7-benzofuranyl N-methylcarbamate which comprises the steps of (a) reacting o-bromophenol with a methallyl halide selected from the group consisting of methallyl chloride and methallyl bromide, in the presence of an acid acceptor, to form o-bromophenyl methallyl ether, (b) rearranging at elevated temperatures o-bromophenyl methallyl ether to produce an isomer selected from the group consisting of 2-bromo-6-methallylphenol and 2-bromo-6-isobutenylphenol, (c) cyclizing at elevated temperatures said isomer to 2,3-dihydro-2,2-dimethyl-7-bromobenzofuran, (d) hydrolyzing in alkaline medium at elevated temperatures of at least 150° C. the 2,3-dihydro-2,2-dimethyl-7-bromobenzofuran to form 2,3-dihydro-2,2-dimethyl-7-benzofuranol, and (e) converting 2,3-dihydro-2,2-dimethyl-7-benzofuranol to 2,3-dihydro-2,2-dimethyl-7-benzofuranyl N-methylcarbamate.

4. Process for the synthesis of 2,3-dihydro-2,2-dimethyl-7-benzofuranyl N-methylcarbamate which comprises the steps of (a) reacting a compound selected from the group consisting of o-bromophenol and a salt thereof with methallyl halide to form o-bromophenyl methallyl ether, (b) rearranging at elevated temperatures o-bromophenyl methallyl ether to produce an isomer selected from the group consisting of 2-bromo-6-methallylphenol and 2-bromo-6-isobutenylphenol, (c) catalytically cyclizing said isomer to 2,3-dihydro-2,2-dimethyl-7-bromobenzofuran, (d) hydrolyzing at elevated temperatures of at least 150° C. in alkaline medium 2,3-dihydro-2,2-dimethyl-7-bromobenzofuran in the presence of a copper catalyst to form 2,3-dihydro-2,2-dimethyl-7-benzofuranol, and (e) converting 2,3-dihydro-2,2-dimethyl-7-benzofuranol to 2,3-dihydro-2,2-dimethyl-7-benzofuranyl N-methylcarbamate.

5. Process for the synthesis of 2,3-dihydro-2,2-dimethyl-7-benzofuranyl N-methylcarbamate which comprises the steps of (a) reacting o-bromophenol with methallyl chloride in the presence of an acid acceptor to form o-bromophenyl methallyl ether, (b) rearranging at temperatures of about 150–300° C. o-bromophenyl methallyl ether to produce an isomer selected from the group consisting of 2-bromo-6-methallylphenol and 2-bromo-6-isobutenylphenol, (c) cyclizing said isomer in the presence of an acidic catalyst to 2,3-dihydro-2,2-dimethyl-7-bromobenzofuran, (d) hydrolyzing with an alkaline hydroxide at elevated temperatures of at least 150° C. 2,3-dihydro-2,2-dimethyl-7-bromobenzofuran in the presence of catalytic amounts of cupric nitrate to form 2,3-dihydro-2,2-dimethyl-7-benzofuranol, and (e) converting 2,3-dihydro-2,2-dimethyl-7-benzofuranol, to 2,3-dihydro-2,2-dimethyl-7-benzofuranyl N-methylcarbamate.

6. Process for the synthesis of 2,3-dihydro-2,2-dimethyl-7-benzofuranol which comprises the steps of (a) reacting o-bromophenol with methallyl halide to form o-bromophenyl methallyl ether, (b) rearranging o-bromophenyl methallyl ether to produce an isomer selected from the group consisting of 2-bromo-6-methallylphenol and 2-bromo-6-isobutenylphenol, (c) cyclizing said isomer to form 2,3-dihydro-2,2-dimethyl-7-bromobenzofuran, and (d) hydrolyzing at elevated temperatures of at least 150° C. 2,3-dihydro-2,2-dimethyl-7-bromobenzofuran to form 2,3-dihydro-2,2-dimethyl-7-benzofuranol.

7. Process for the synthesis of 2,3-dihydro-2,2-dimethyl-7-benzofuranol which comprises the steps of (a) reacting o-bromophenol with methallyl halide to form o-bromophenyl methallyl ether, (b) rearranging and cyclizing o-bromophenyl methallyl ether to form 2,3-dihydro-2,2-dimethyl-7-bromobenzofuran, and (c) hydrolyzing at elevated temperatures of at least 150° C. 2,3-dihydro-2,2-dimethyl-7-bromobenzofuran to form 2,3-dihydro-2,2-dimethyl-7-benzofuranol.

References Cited
UNITED STATES PATENTS
2,323,781   7/1943   Kohler _____ 260—640
3,073,848   1/1963   Wasson et al. _____ 260—347.4

OTHER REFERENCES
Brewer: Organic Chemistry (Prentice-Hall, 1948), p. 108.

Piers et al.: Canadian J. Chemistry, vol. 41, No. 12 (1963) pp. 2917–30.

HENRY R. JILES, *Primary Examiner.*

ALEX MAZEL, *Examiner.*

UNITED STATES PATENT OFFICE
CERTIFICATE OF CORRECTION

Patent No. 3,356,690                      December 5, 1967

Edward F. Orwoll

It is certified that error appears in the above identified patent and that said Letters Patent are hereby corrected as shown below:

Column 2, line 41, for "of", first occurrence, read -- for --; column 4, line 4, strike out "steps of (a) reacting o-bromophenol with methallyl"; line 11, for "elevator" read -- elevated --.

Signed and sealed this 29th day of July 1969.

(SEAL)
Attest:

Edward M. Fletcher, Jr.                     WILLIAM E. SCHUYLER, JR.
Attesting Officer                              Commissioner of Patents